(12) United States Patent
Singh

(10) Patent No.: US 6,389,447 B1
(45) Date of Patent: May 14, 2002

(54) SYSTEM AND METHOD FOR PROVIDING ADAPTIVE TASK MANAGEMENT IN A MULTI-APPLICATION DEVICE

(75) Inventor: Mona Singh, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/176,343

(22) Filed: Oct. 21, 1998

(51) Int. Cl.[7] .................................................. G06F 9/00
(52) U.S. Cl. ........................................ 709/100; 709/107
(58) Field of Search ................................. 709/100, 310, 709/101, 102, 103, 104, 105, 106, 107, 108; 712/21

(56) References Cited

PUBLICATIONS

An article entitled "SwitchHack 1.31" dated Jun. 3, 1998, two pages.

*Primary Examiner*—Majid A. Banankhah
(74) *Attorney, Agent, or Firm*—Coats & Bennett, P.L.L.C.

(57) ABSTRACT

A method for managing tasks in a multi-application device having a stack and a plurality of positions for storing identification of tasks, the tasks on the top of the stack being an active task. The method comprises the steps of sequentially cycling through the stack of tasks, selecting one of the plurality of tasks by invoking an action in the task, moving the selected task to the top of the stack, and pushing each task between the top of the stack and the selected task down one position in the stack.

12 Claims, 8 Drawing Sheets

| 0 | CALENDAR |
|---|---|
| 1 | DAY PLANNER |
| 2 | PHONEBOOK |
| 3 | CALCULATOR |
| 4 | NOTEPAD |
| 5 | EMAIL |
| 6 | SPREADSHEET |
| 7 | |

*FIG. 2*

| 0 | TELEPHONE |
|---|---|
| 1 | CALENDAR |
| 2 | DAY PLANNER |
| 3 | PHONEBOOK |
| 4 | CALCULATOR |
| 5 | NOTEPAD |
| 6 | EMAIL |
| 7 | SPREADSHEET |

*FIG. 4*

| 0 | TELEPHONE |
|---|---|
| 1 | CALENDAR |
| 2 | DAY PLANNER |
| 3 | PHONEBOOK |
| 4 | CALCULATOR |
| 5 | NOTEPAD |
| 6 | ➡ EMAIL |
| 7 | SPREADSHEET |

*FIG. 7*

| 0 | EMAIL |
|---|---|
| 1 | TELEPHONE |
| 2 | CALENDAR |
| 3 | DAY PLANNER |
| 4 | PHONEBOOK |
| 5 | CALCULATOR |
| 6 | NOTEPAD |
| 7 | SPREADSHEET |

*FIG. 8*

| 0 | EMAIL |
|---|---|
| 1 | TELEPHONE |
| 2 | CALENDAR |
| 3 | DAY PLANNER |
| 4 | ➡ PHONEBOOK |
| 5 | CALCULATOR |
| 6 | NOTEPAD |
| 7 | SPREADSHEET |

*FIG. 9*

| 0 | PHONEBOOK |
|---|---|
| 1 | EMAIL |
| 2 | ➡ TELEPHONE |
| 3 | CALENDAR |
| 4 | DAY PLANNER |
| 5 | CALCULATOR |
| 6 | NOTEPAD |
| 7 | SPREADSHEET |

*FIG. 10*

| 0 | TELEPHONE |
|---|---|
| 1 | PHONEBOOK |
| 2 | EMAIL |
| 3 | CALENDAR |
| 4 | DAY PLANNER |
| 5 | CALCULATOR |
| 6 | NOTEPAD |
| 7 | SPREADSHEET |

*FIG. 11*

SYSTEM AND METHOD FOR PROVIDING ADAPTIVE TASK MANAGEMENT IN A MULTI-APPLICATION DEVICE

FIELD OF THE INVENTION

This invention relates to small, multi-application devices, and, more specifically, to application (task) management in such devices.

BACKGROUND OF THE INVENTION

Small computers have moved from single function devices (such as calculators, address books, etc.) to sophisticated, multi-application devices that rival full size desktop computers in functionality. These small, multi-application devices now include everything from address books or phone books to e-mail and even full-functionality telephones. As these devices become smaller, while the number of functions continues to grow, there is a tension between the size of a display screen and the amount of information displayed on the screen so that the user can manage the tasks on the device to full utility.

Each application comprises one or more "tasks" and each task has its own graphical user interface. On desktop computers, a tasks's graphical user interface is displayed along with the graphical user interface of the other open tasks. In handheld computers with correspondingly small displays, it is not possible to simultaneously display more than one graphical user interface. Therefore, various task management systems have been developed in order to deal with this problem. Some devices employ a drop-down list wherein the user pushes a button on the display and identification of all open tasks is displayed. This solution is limited, however, to the size of the screen. If only four or five lines are available on the screen, then only four or five tasks can be open at one time. A variation on this, using a scroll bar with a drop-down list, is counter-intuitive because it is not always clear what tasks are available and how many more tasks need to be displayed.

Other devices use a FIFO-like system in which an indication or identification of each task is displayed responsive to a button being pushed. However, the user has to cycle through the entire array of tasks in order to find a specific task. Other systems permit the user to back up one task and then toggle between two tasks. In order to get to a third task, however, the user must kill or close one or both of the other tasks.

Therefore, there is a need in the art for a simple, intuitive system for selecting tasks in small screen multi-application devices.

SUMMARY OF THE INVENTION

According to one aspect of this invention, a method is provided for managing tasks in a multi-application device. The method includes the steps of sequentially opening more than two tasks, pushing each task on a top position of a stack as an active task as each task is open, and pushing previously open tasks down one position in a stack. Further, the method includes sequentially cycling through the stack of tasks, selecting one of the plurality of tasks as a new active task, moving the new active task from a previous position in the stack to the top of the task and pushing each of the other tasks from the current task to a task before the previous task down one position in the stack. According to another aspect of the invention, the step of selecting one of the plurality of tasks includes taking action in one of the tasks in the stack.

Further, according to another aspect of the invention, the method includes displaying a graphical user interface for each of the tasks. The method further includes the step of killing a predetermined number of tasks at the bottom of the stack after a predetermined time.

In accordance with another aspect of this invention, a task manager is described for a multi-application device wherein the multi-application device has a screen and has more than two open tasks, each of the open tasks having an identification and a display of indicia of the task. The task manager, according to this invention, includes a stack having a plurality of slots including a top slot, each slot being adapted to store an identification of an open task, means for displaying indicia of a task in the top slot of the stack on the screen, a stepping mechanism adapted to sequentially step from the top slot of the stack downwardly and display the indicia associated with the open task in each slot. Further, the task manager includes a user input adapted to select a task responsive to manipulation of the tasks displayed, means for moving the identification of the selected tasks to the top of the stack responsive to said means for selecting, and means for pushing the rest of the tasks down one slot.

BRIEF DESCRIPTION OF THE DRAWINGS

A more complete understanding of this invention may be obtained from a consideration of the following detailed description in conjunction with the drawings, in which:

FIG. 2 illustrates a stack of tasks as used in the device of FIG. 1;

FIG. 4 is an illustration of the stack of FIG. 2 after a new task has been added to the stack;

FIG. 7 is a stack diagram illustrating a selected task;

FIG. 8 is a stack illustrating the task being moved to the top;

FIG. 9 is an illustration of a stack wherein another task has been selected;

FIG. 10 is an illustration of a stack wherein another task has been selected;

FIG. 11 is a stack diagram after all tasks have been selected;

DETAILED DESCRIPTION OF THE PREFERRED EMBODIMENT

In many computer operating systems, tasks (applications) are thought of as an array of entries where each task has a fixed location in the array. The present invention shifts the concept of the fixed array to an array used as a stack wherein the top of the stack is the currently operating application. As tasks are opened, they are pushed on the top of the stack and each previously opened task is pushed down one location. When the user wants to change tasks, the user presses a single button and sees the graphical interface of the previous task. The user can continue scrolling through the stack array and hence the graphical interface until he or she finds the desired task. The user then manipulates the task in some fashion to select the task as the current task. The selected task is moved to the top of the stack and each entry is moved down one to the vacated entry. In this manner, the most frequently used tasks are towards the top of the stack. The least frequently used are at the bottom of the stack, which can be closed after a period of time as no longer being of interest to the user.

Figure 1:
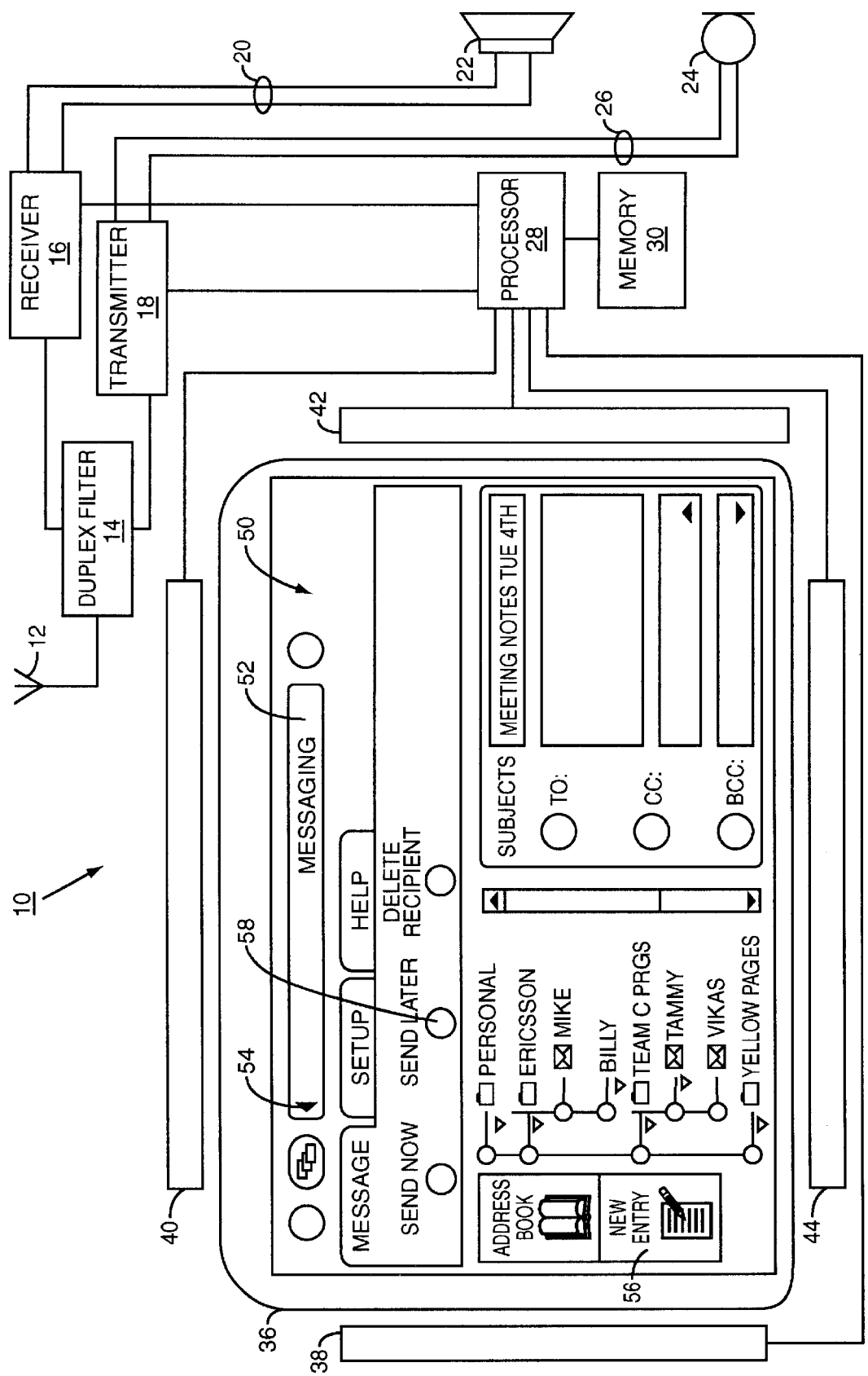
FIG. 1 comprises a block diagram of a multi-application communication device according to this invention.

FIG. 1 illustrates a block diagram of a multi-application communication device 10, also called a "communicator," according to an exemplary embodiment of this invention. The multi-application communication device 10 includes an antenna 12 for sending and receiving radio signals between itself and the public land mobile network (not shown but well known in the art). The antenna 12 is connected to a duplexer 14, which enables receiver 16 and transmitter 18 to receive and broadcast, respectively, on the same antenna. The receiver 16 demodulates, demultiplexes and decodes the radio signals into one or more channels. Such channels include a control channel and a traffic channel for speech or data. The speech or data are delivered over wire pair 20 to speaker 22, or other output device (such as a fax or modem connector).

A microphone 24 receives speech signal input, converts the input into analog electrical signals and delivers the analog electrical signals to transmitter 18 over wire pair 26. The transmitter converts the analog electrical signals into digital data, encodes the data with error detection and correction information and multiplexes this data with control messages from processor 28. The transmitter 18 modulates this combined data stream and broadcasts the resultant radio signal to the public land mobile network through diplexer filter 14 and antenna 12.

The processor 28 runs a plurality of tasks in the multi-application communication device 10 using programs and data stored in memory 30. The processor 28 also controls a video display 36 causing it to display a graphical user interface related to the currently active task (application). Such graphical interface includes text, symbols, icons and pictures, as is known in the art. According to this exemplary embodiment of this invention, the screen 36 is a touch screen. To this end, vertical transducer 38 and horizontal transducer 40 emit optical or audio waves to vertical receiver 42 and horizontal receiver 44, respectively. A finger touch on display 36 interrupts the wave flow, whereby processor 28 determines the location of the touch based on the coordinates reported by receivers 42 and 44, as is known in the art. Thus, processor 28 displays various text, icons, etc. on the screen and runs the application programs according to the coordinates of the touch location. Of course, this invention is being described in the context of the communicator 10 of FIG. 1. This invention also applies to "palm top," pocket and other forms of small multi-application computer devices.

In this exemplary embodiment, a display for an e-mail messaging application 50 is shown. As is known in the art, each application has one or more graphical user interfaces for carrying out tasks. Further, there is a title bar 52 on this graphical user interface that displays a name of the currently operating application, in this case, "Messaging." An arrow control 54 is displayed within the current task box 52. By touching the arrow 54, the user can step backwards in the stack of tasks. For each step backwards, the tasks's graphical user interface is displayed. When a user finds the task that he or she wishes to use, the user touches one of the action areas. In the e-mail application of FIG. 1, such action areas include the "new entry" tab 56 or the "send later" button 58. The identification of the task is then shown in the task box 52 and identification of the task is moved to the top of the stack.

Turning now to FIG. 2, a stack as used in an exemplary embodiment of this invention is shown. In this exemplary embodiment, there are eight slots in stack 200 labelled 0 through 7. As each application is opened, an identification of the task is placed in entry 0 of the stack, and the previous entries move down one slot.

Figure 3:
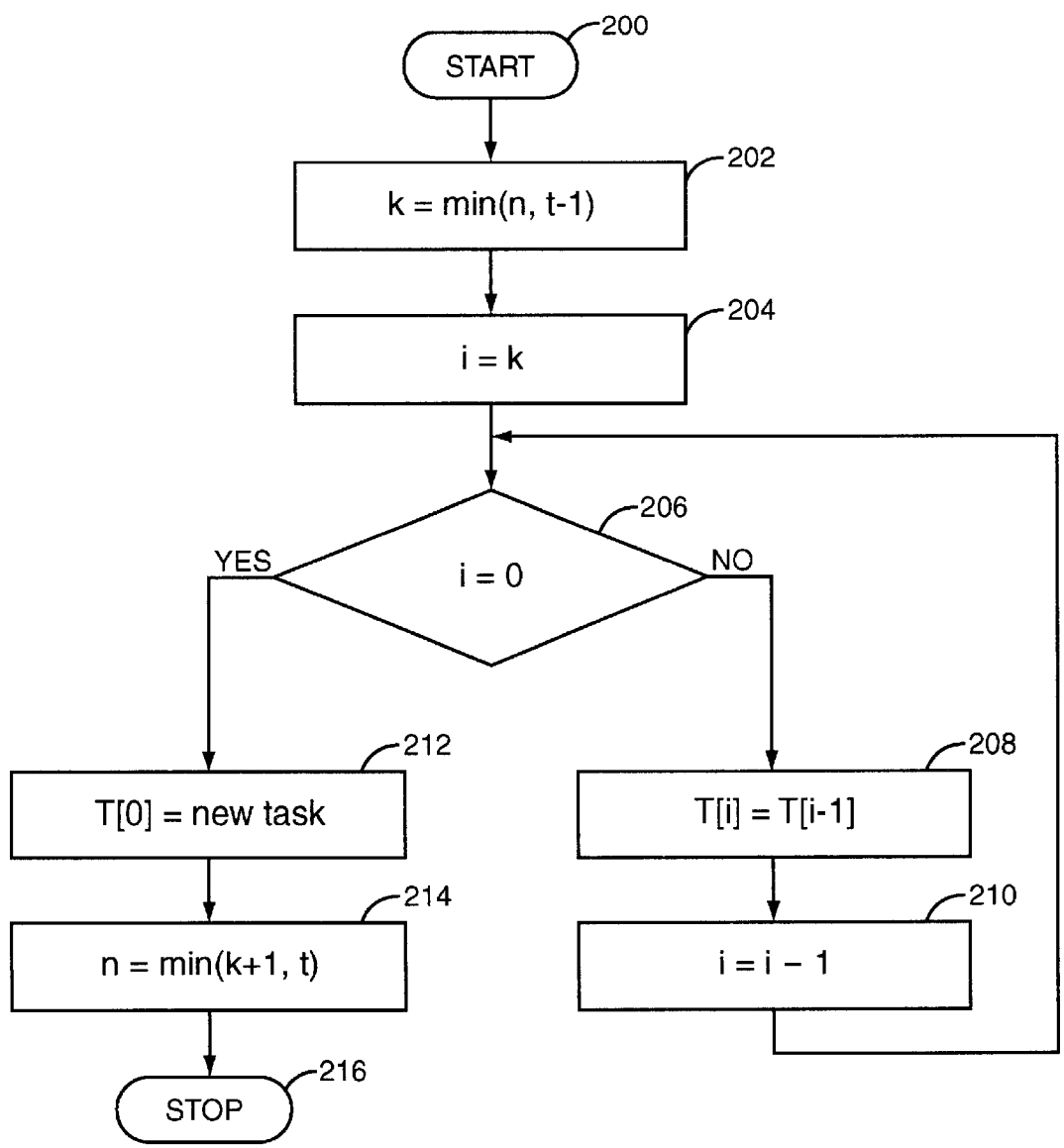
FIG. 3 comprises a flow of processing for opening tasks in the device of FIG. 1.

Opening a task is illustrated in FIG. 3. Processing begins in FIG. 3 in circle 200, when a new task is opened. In the following examples, T is the stack array of tasks, T[0] is the current or active task, t is the maximum number of tasks (8 in this example), and n is the actual number of tasks in T (7 in FIG. 2). m is the number of tasks allowed to remain active for longer than a defined time, i, l, s and k are used herein as indexes, as is known in the art. An index k is set to the minimum of the actual number of tasks (n) or the maximum slot number (t−1). Processing proceeds to action box 204, where an index i is set to the value of k. Processing then moves to decision diamond 206 where a determination is made if the index i equals 0. If the result is no, processing moves to box 208. In box 208, the lowest task in the stack is pushed down one slot. (k is the first open slot in the stack because the slots in the example arrays are numbered starting with 0. If there are 3 tasks on the stack, k=3 and the tasks are in slots 0–2.). In box 210, the index is decremented by 1 and processing loops back to decision diamond 206. A determination is again made whether the index is equal to 0. Processing continues in this loop until all tasks have been pushed down one slot.

After all tasks are pushed down one slot, the index will be equal to 0 in decision diamond 206 and processing moves to box 212 where the new task is placed on the top of the stack. In box 214, the number of tasks n is set to the smaller value of (k+1) or the maximum number of tasks (t). Processing ends at circle 216.

Comparing FIGS. 2 and 4, FIG. 2 is a stack array prior to adding a new task and FIG. 4 is a stack array after a new task is added. All entries from calendar through spreadsheet have been moved down one slot and a new task, "telephone", has been moved into the active slot 0.

Figure 5:
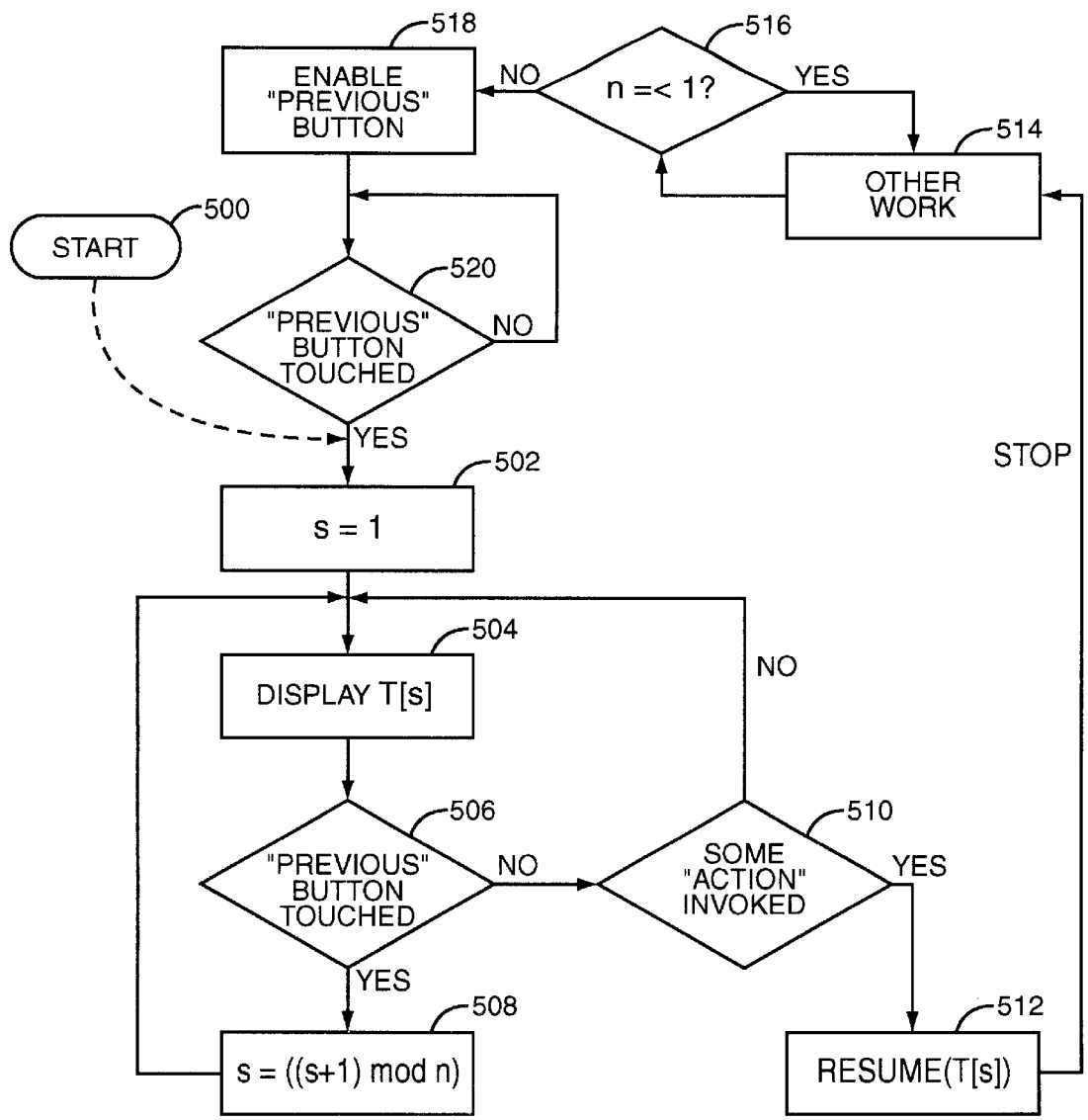
FIG. 5 is a flow diagram of selecting one of the tasks in the stack as a new active task.

Turning now to FIG. 5, a flow diagram for task selection is shown. Processing starts in circle 500 and moves to box 502 where an index s is set to one. Processing then moves to box 504 where the task T[s] is displayed. In other words, the graphical user interface of the application may be displayed or just the name of the task may appear in the task box 52. Processing continues to decision diamond 506 where a determination is made if the "previous" button has been touched. If it has, then processing proceeds to box 508 where the index is incremented and (s+1 modulo n) is the new index. The modulo division facilitates cycling from the last entry (7 in this example) to the first entry (0). Processing then returns to box 504 where the next entry is displayed.

If, in decision diamond 506 the previous button is not touched, then processing moves to decision diamond 510 where a determination is made if some action is invoked. In this case, an action could be manipulation of one of the buttons or keys in the graphic user interface for that application. Alternatively, only certain actions may be recognized, such as writing in the display, and other actions ignored, such as touching scroll bars, etc. Furthermore, a task may be selected if no action is invoked, but the user has the graphical user interface displayed for a predetermined time. If, in action box 510, an action is not invoked, then processing goes back to box 504 where the current task t[s] is displayed. If, in decision diamond 510, some action is invoked, processing moves to the resume subroutine 512

(FIG. 7), the resume subroutine will be described in connection with FIG. 6 below.

After the resume subroutine, processing moves to action box 514. In action box 514, other work in the current task, that is the e-mail task, is performed. Processing moves to decision diamond 516 where determination is made if n<1. If n<1, then there is only one application on the stack and processing returns to action box 514. If, in decision diamond 516, there is more one application on the stack, then processing moves to box 518 where the previous button (54 in FIG. 1) is enabled.

Figure 6:
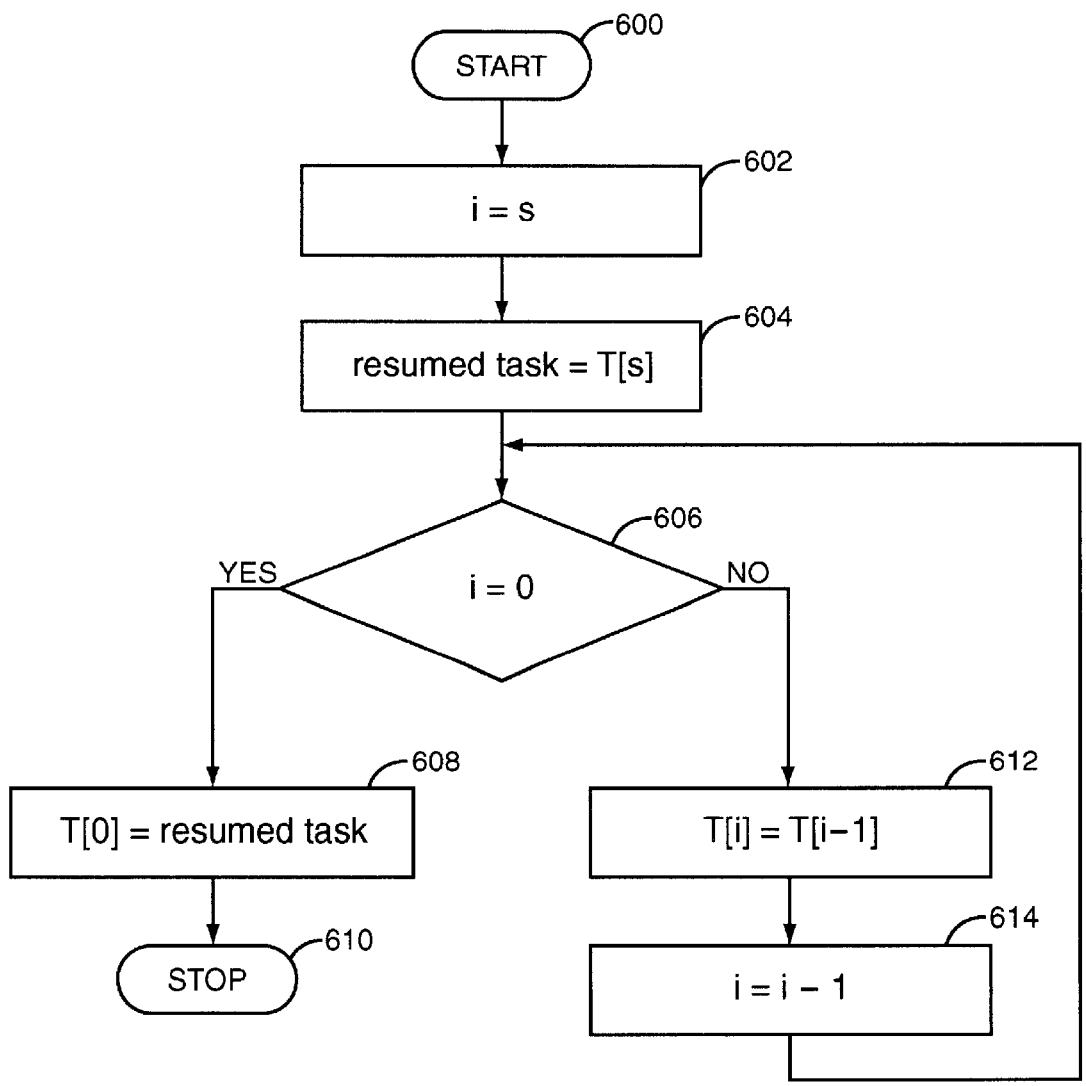
FIG. 6 is a flow diagram of resuming a task.

Turning now to FIG. 6, processing of the resume subroutine called at the box 512 of FIG. 5 starts in circle 600 and moves to action box 602 where an index is set to the number of the slot of the selected task in which action was invoked. Processing proceeds to action box 604 where the resumed task is set to the selected task. A determination is made in decision diamond 606 whether i=0; (i is 0 when there is only one task open, or alternatively, the action was performed in the first (0) task in the stack). If i does equal 0, then, in action box 608, the resumed task is moved to the "0" (i.e., the first slot) slot in the stack and processing ends in circle 610.

If, in decision diamond 606, i does not equal 0, then processing proceeds to action box 612 wherein the entry in the previous slot (to the selected one) is moved down one position. The index i is decremented in action box 614 and processing loops back to decision diamond 606. This branch of code 606, 612, 614 is repeated until the top slot is reached (i=0).

FIGS. 7 and 8 illustrate the selection of the task and moving it to the top of the stack implemented by the flow chart of FIG. 5. In FIG. 7, the e-mail task has been selected as noted by the arrow. In FIG. 8, the e-mail has been moved to the 0 position and all of the other tasks have been moved down one slot in the stack.

Turning now to FIG. 9, a further example of the operation of the stack according to this invention is shown. If, for example, the phone book application is next selected (as indicated by the arrow in slot 4), then the phone book application is moved to the top of the stack and each entry in the stack is pushed down one (according to processing described in FIG. 5). Next, if the telephone application is selected as in FIG. 10 (as indicated by the arrow in slot 2), then the telephone application is pushed to the top of the stack and each entry is pushed down one (FIG. 11). In this manner, the most recently used applications tend to cluster at the top of the stack, thus rendering them the most used applications more easily accessed than in the prior art.

Figure 12:
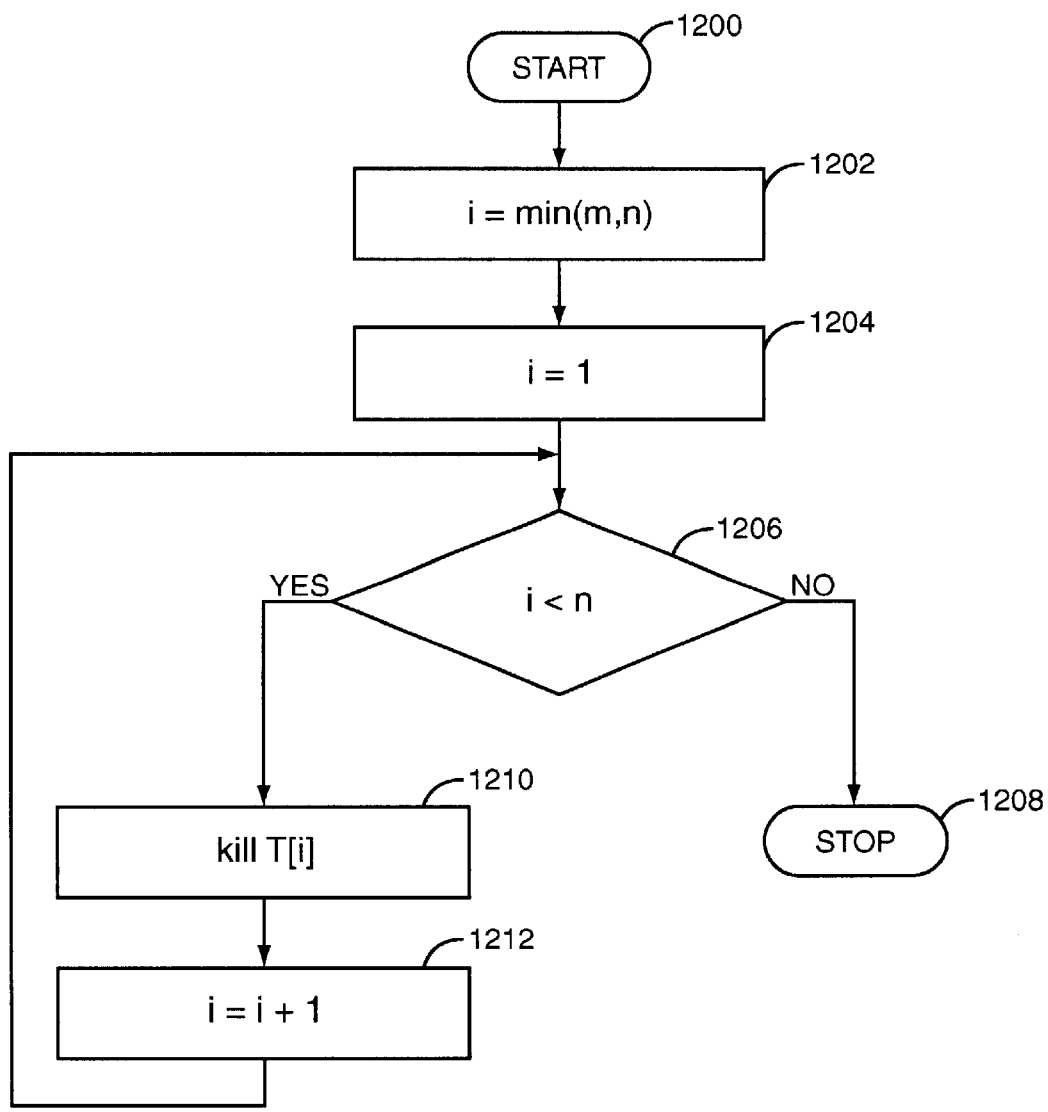
FIG. 12 is a flow diagram for removing a task for garbage collection.

Not only are the most used tasks at the top of the stack, the least used tasks are at the bottom. A predetermined number of tasks, m in this exemplary embodiment, are determined to be no longer useful. Therefore, turning now to FIG. 12, a garbage collection routine starts in circle 1200 and moves to action box 1202. In action box 1202, an index I is set to the minimum of m or n. By setting I to the minimum of m or n, I is set to the smaller of the current number of tasks in the stack (n) or the tasks to be left after garbage collection (n). Moving to action box 1204, i is set to I.

In decision diamond 1206, a determination is made if i<n. In other words, a determination is made whether the index i is less than the actual number of tasks in the stack. If not, then processing ends in circle 1208. If there are an excess number of tasks (i is greater than n), then processing moves to action box 1210 where the i (or m+1) task is killed (closed). Processing continues to action box 1212 where i is incremented. A determination is again made in action box 1206 whether there are excess tasks. Each task below task m is killed until all of the tasks below slot m are closed.

Thus, this invention provides a method, and a system that supports the method, for managing tasks in a multi-application environment. The most-used tasks migrate towards the top of a stack and the least-used tasks migrate towards the bottom. In applications where there is little screen room for information, applications may be more quickly and efficiently selected. Further, less used applications may be closed if they have not been used recently.

It is to be understood that the above-described embodiment is to illustrate the principles of this invention, and that those skilled in the art may devise many variations without departing from the scope of the invention. It is, therefore, intended that such variations be included within the scope of the appended claims.

What is claimed is:

1. A method for managing tasks in a multi-application device, said method comprising the steps of:

sequentially opening more than two tasks, pushing each task on a top position of a stack as an active task as each task is opened, and pushing previously opened tasks down one position in the stack;

sequentially cycling through the stack of tasks;

selecting one of the plurality of tasks as a new active task;

storing the new active task from a previous position in the stack;

moving each of the other tasks down one position in the stack; and pushing the new active task on the top of the stack.

2. The method of claim 1 further including killing a predetermined number of tasks at the bottom of the stack after a period of time.

3. The method of claim 1 wherein the step of sequentially cycling through the stack of tasks include displaying a graphical user interface associated with each task.

4. The method of claim 3 wherein the step of selecting a task comprises taking action in a task when its graphical user interface is displayed.

5. The method of claim 3 wherein the step of selecting a task comprises displaying a graphical user interface for a predetermined period of time.

6. A method for managing tasks in a multi-application device, said multi-application device comprising a processor and a memory wherein the processor maintains a stack having a plurality of positions for storing more than two tasks, one of said tasks on the top of the stack being an active task, said method comprising:

sequentially cycling through the stack of tasks in memory;

selecting one of the plurality of tasks by a user invoking an action in the task;

pushing each task down one position in the stack; and moving said selected task to the top of the stack.

7. The method of claim 6 wherein the step of sequentially cycling through the stack of tasks is performed by the processor responsive to input from the user.

8. The method of claim 7 further including the step of removing one or more tasks from the bottom of the stack after the one or more tasks have been at the bottom of the stack for a predetermined time.

9. A task manager for a multi-application device, said multi-application device having a processor, memory and a screen, said processor running more than two open tasks, each of said open tasks having an identification and a display of indicia of said task, said task manager comprising:

a stack stored in said memory having a plurality of slots including a top slot, each slot being adapted to store an identification of an open task;

means for displaying the indicia of a task in the top slot of the stack on the screen;

said processor being adapted to sequentially step from the top slot of the stack downwardly and cause the indicia associated with the open task in each slot to be displayed on the screen;

a user input adapted to select a task responsive to manipulation of the task's display;

means for moving the identification of the selected task to the top of the stack responsive to said means for selecting; and means for pushing the tasks down one slot to make room for the selected task.

10. The task manager of claim 9 further including means for removing tasks from the bottom of the stack after a predetermined time.

11. The task manager of claim 9 wherein said indicia of said task comprises a graphical user interface.

12. The task manager of claim 9 wherein said indicia of said task comprised an area on said screen with a name of the task displayed therein.

* * * * *